Jan. 10, 1956 H. P. LUDWIG 2,729,873
METHOD OF MANUFACTURING A CONCRETE PIPE JOINT
Filed Jan. 9, 1951

INVENTOR.
HERBERT P. LUDWIG
BY
Lyon+Lyon
ATTORNEYS

United States Patent Office 2,729,873
Patented Jan. 10, 1956

2,729,873

METHOD OF MANUFACTURING A CONCRETE PIPE JOINT

Herbert P. Ludwig, Colton, Calif., assignor to Concrete Conduit Company, Colton, Calif., a corporation of California Application January 9, 1951, Serial No. 205,059

1 Claim. (Cl. 25—154)

My invention relates to concrete pipe joints and method of manufacture, more particularly to joints for centrifugally cast concrete pipe of either the bell and spigot or double spigot and collar type, intended to carry fluid under pressure and involving the use of a rubber or rubber-like gasket or seal.

Centrifugally cast concrete pipe intended to withstand internal pressure has been in extensive use for many years, but such use, nevertheless, has been severely curtailed by the problems involved in connecting sections of pipe. Both bell and spigot and double spigot and collar connections have been used. Whereas in the case of certain types of concrete pipe or soil pipe, simple cement joints may be used, the connecting of centrifugally cast concrete pipe for the rigorous purposes to which it is frequently put, presents serious problems. These problems are, generally, those of expansion and contraction, flexing, weathering and, of course, cost.

In the past, centrifugally cast reinforced cement connections, whether the collar and spigot or bell and spigot type, were of necessity rigid. This has been due, in part, to the fact that the internal surfaces of centrifugally cast pipe and connecting members as heretofore manufactured were too imperfect. The inherent nature of the spinning process has made it impossible to achieve internal surfaces of sufficiently precise diameter, so that a gasket or a seal ring, when applied to such surface, could effect a seal. A seal could only be obtained by use of caulking and cement grouting. Such sealing means is, of necessity, rigid and brittle and requires the connecting sections of pipe to be immobilized; however, in practice, this is impossible. The pipe sections expand and contract both radially and longitudinally; they settle in one area more than another and thus flex. When layed on or buried in sloping ground, downgrade creeping may occur. Even though such movement be slight, nevertheless, the grouting eventually gives way and repair is required.

In order to improve flexibility and permit a limited degree of expansion and contraction, metal joints have been used. Such joints have surfaces of the necessary close tolerance so as to permit use of gaskets. But unless special alloys are used, at a prohibitive cost, the metal weathers, rusts, or is attacked electrolytically. The advantages of flexibility, expansion and contraction are thus, to a large degree, lost, for in order to protect the metal connections, grouting is used. This only postpones for a short time the need of repair, for upon cracking of the grouting, the metal is exposed to attack and eventually, the connection fails and repair is needed.

Whether the pipe connections above referred to involve concrete or metal facings, the cost of field installation is high, due to the hand labor involved. In order to caulk or grout the joints, access to all sides of the connections is required. This requires the digging of trenches wider than otherwise necessary, or the hand digging of access spaces opposite each joint. Still further, in many cases, inside grouting or caulking is required. Obviously, this limits the use of such reinforced concrete pipe to the larger sizes through which a workman can crawl.

The present invention envisions a centrifugally cast collar or bell of such nature as to avoid the aforementioned difficulties and provide an inner gasket-supporting surface of such tolerance as to permit the effecting of a seal without caulking, grouting and the like, and without resort to a metal surface.

Bearing the problems in mind as outlined above, the objects of my invention include:

First, to provide a concrete pipe joint and method of manufacture wherein the radially confronting surfaces of the pipe joint are formed of concrete without a facing or lining of metal and wherein a gasket groove is cast in the overlying part of the joint.

Second, to provide a concrete pipe joint and method of manufacture wherein the confronting surfaces, although formed of cementitious material and free of any metal lining or facing, may be held to close tolerances so as to facilitate the use of a rubber gasket of the O-ring type and permit movement of the joint when the pipe sections connected thereby, expand, contract or settle.

Third, to provide a concrete pipe joint and reinforcing centrifugally cast pressure pipe which is particularly economical of manufacture and of installation, and which may be readily constructed in all sizes, from small pipe in which internal access is impossible to larger pipe which may be both internally and externally inspected.

Fourth, to provide a concrete pipe section which permits axial lateral and angular displacement without destroying the seal, thus providing a concrete pipe connection which permits the formation of large radius bends without use of special pipe sections.

Fifth, to provide a concrete pipe connection which includes a shoulder limiting telescoping movement and wherein the sealing means is so located and the proportions of the connecting members are such that substantial separation from their normal position may occur, thus permitting a large number of pipe sections to "bottom" on their respective shoulders as may occur by reason of downgrade slippage without causing another connection to part and fail.

Sixth, to provide a novel method of and means for centrifugally casting the bell end of concrete pipe or the centrifugal casting of pipe collar in such a manner as to produce a smooth internal surface, held to close tolerances and which includes the casting in situ of a precisely located sealing gasket or the forming of an accurate gasket groove.

Seventh, to provide a method and means of this class wherein a novel but simple means is employed to retain the sealing gasket or gasket groove casting ring in place during the casting operation, but which permits ready removal of the finished product from its casting form.

With the above and other objects in view, as may appear hereinafter, reference is directed to the accompanying drawings in which.

Figure 1:
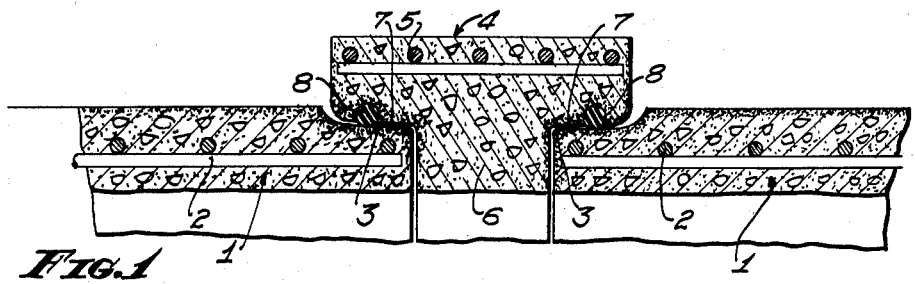
Figure 1 is a fragmentary sectional view, showing adjacent sections of a double spigot pipe connected by a collar incorporating my invention.

I have developed a centrifugally cast reinforced pipe joint and method of its manufacture which overcomes the deficiences of prior attempts to solve the problem and attention, therefore, is first directed to Figure 1. The concrete pipe joint, here disclosed, involves adjacent pipe sections 1 containing reinforcing 2. These sections are formed by conventional centrifugal casting techniques, and are provided at their extremities with spigot ends 3 which are tapered. Due to the centrifugal casting of the pipe, the surface of the spigot end contains a high percentage of fines and cement and is therefore both dense and smooth and accurate.

Adjacent sections of pipe 1 are connected by a collar 4. The collar 4 is formed of concrete with reinforcing 5 and is centrifugally cast in a manner to be described hereinafter. The collar 4 includes a central internal flange 6 of approximately the same internal diameter of the pipe to be joined. At each axial extremity, the collar is provided with a recess 7, having a tapered wall conforming closely to the surface of the spigot end 3. By virtue of the special casting procedure outlined hereinafter, the surface of the recess 7 is smooth and has a high concentration of fines and cement so that it is both dense and impervious and accurate. Cast in the walls of each recess 7 is a groove of circular cross section contoured to receive a gasket 8. The gasket protrudes inwardly from the surface of the recess 7 about one-third or one-fourth its diameter, and is adapted to seal against the confronting smooth surface of the spigot end 3.

Figure 2:
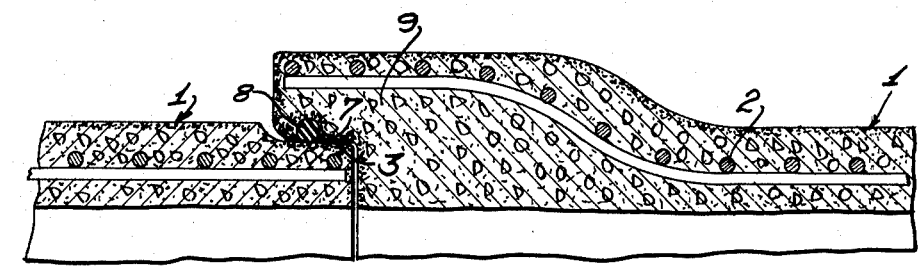
Figure 2 is a fragmentary sectional view of a joint between the ends of bell and spigot type of pipe.

Reference is now directed to Figure 2. Here illustrated are adjacent sections of a concrete pipe 1. One end of each pipe forms a spigot 3, whereas the other end of each pipe is enlarged to form a bell 9. The bell 9 has a recess 7 and is provided with a gasket groove which receives a gasket 8, identical to the recess end gasket of the collar 4, shown in Figure 1.

Figure 3:
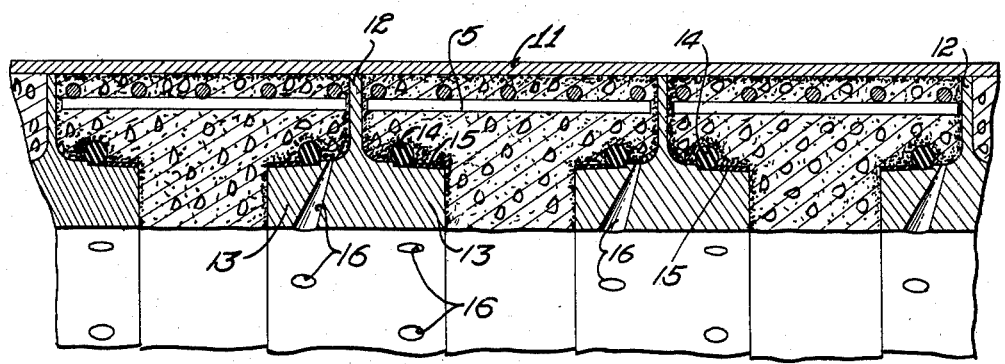
Figure 3 is a fragmentary sectional view, indicating the method and apparatus for casting pipe collars of the type depicted in Figure 1.

Reference is now directed to Figure 3 which illustrates the apparatus employed in casting the collar shown in Figure 1. The collars are cast within a casting shell 11, similar to that employed in casting a conventional concrete pipe. Prior to casting, the shell 11 is fitted with a plurality of spaced rings 12. Each ring 12 is provided with axially directed lips 13 of a thickness equal to the spigot end of a pipe to be received by the collar 4. The contour of each lip 13 thus corresponds to the recess 7.

Fitted between the rings 12 within the shell 11 is the reinforcing 5 of the collars to be formed. It will thus be seen that a series of collars may be cast simultaneously by use of several rings 12 in a shell which may, if desired, be as long as a pipe section.

The radially outer surfaces of the lips 13 taper axially and are relieved slightly. A gasket groove or casting ring 14, preferably formed of rubber, is slipped over the relieved surface of each lip 13, and is held in place by a flat rubber band 15, compensating for the relieved portion of the lip between the ring 14 and the axial extremity of the lip. Each lip 13 is pierced by a series of bleeder ports 16 which intersect the radially outer surface of the lip between the casting ring 14 and the ring 12. The bleeder ports diverge radially inward to minimize clogging.

After the rings 12, with their gasket forming rings 14 in place, have been inserted in the shell 11 along with the reinforcing units 5 in the manner depicted in Figure 3, the shell 11 is rotated by conventional pipe casting machinery, and a cement-concrete mixture is introduced in a conventional manner. The concrete is urged by centrifugal force against the shell 11, and the pressure of the radially inner portions of the concrete causes the outer portions of the concrete to spread axially into the annular cavities formed between the lips 13 and the casting shell 11. Any excess moisture in the region between the axial extremities of the lips and the gasket casting rings 14 is displaced toward the extremities of the lips, due to the fact that these surfaces of the lips are tapered. Once in the region between the lips, the excess moisture finds its way through the concrete to the internal surface of the flange 6 formed between adjacent lips. Moisture which may be entrapped between the gasket casting rings 14 and the central rings 12, is displaced through the bleeder ports 16. As a result, the surface of the recesses 7, formed between lips 13 is smooth and accurate as to dimension. The mass of concrete contained in the internal flange 6, formed between the lips 13, under urge of centrifugal force provide adequate force to insure lateral displacement of the radially outer mass of material and to form a void-free structure. Under this condition there is a tendency for the fines and cement to concentrate on the radially outer surface of the lips 13, around the rings 14 and over the band so that the finished product has a void-free, dense and exceptionally smooth surface of accurate contour. This is of great importance and is an accomplishment which has defied previous attempts to make a practical reinforced concrete joint.

The casing rings 14 may be left in place and thus they become the sealing gaskets 8. Under some conditions, particularly where there is the need for excessive handling or storage and the gaskets might be unduly exposed, it is desirable to remove these rings after casting the collar, then just prior to assembly, insert the seal rings 8. This also permits use of rubber having greater Shore hardness for the rings 14 and lesser Shore hardness for the gaskets 8. After casting the series of collars within the shell 11, and after proper curing or partial curing, the shells are removed. It should be observed that the casting shell is split longitudinally to permit removal of the finished collars.

Figure 4:
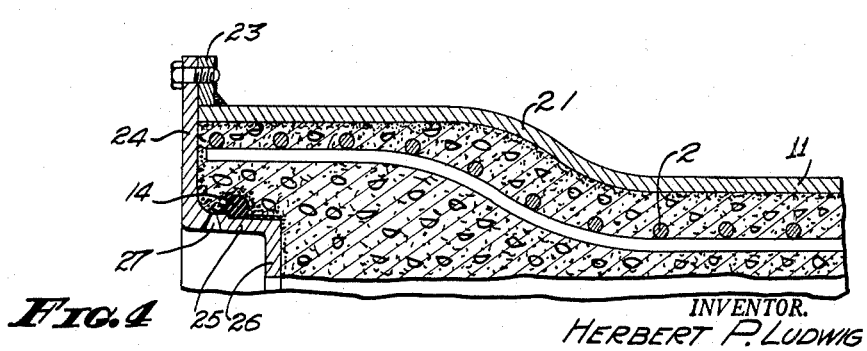
Figure 4 is a fragmentary sectional view, showing the method and apparatus employed in casting the bell end of a pipe section depicted in Figure 2.

Reference is now directed to Figure 4. In the casting apparatus, herein shown, a conventional casting shell 21 is employed, shaped at one end to form a bell 22. The casting shell is provided with a flange 23 to which is secured a ring 24, having at its radially inner extremity an axially directed lip 25. The lip, in turn, terminates in a radially inwardly directed flange 26. Alternatively, the ring 24 may be provided with a lip 13 as shown in Figure 3. The surface of the lip 25 and flange 26 is in any case identical with that of the lip 13. The radially outer surface of the lip 25 receives a gasket casting ring 14 and retainer band 15. Also the lip 25 is provided with bleeder ports 27, corresponding to the bleeder ports 16. In centrifugally casting the concrete pipe, a recess 7 is formed in the bell end similar to the recess formed in each end of the collar 4.

The retainer band is of primary importance in the casting of the collars 5 or bell ends 9. After casting, the casting rings 12 or 24 may be readily removed because the bands 15 strip freely therefrom; whereas, if the sealing rings 8 or groove forming rings 14 were recessed into the casting rings, it would be difficult to remove the casting rings.

It will be observed that although the ring 14, being of rubber or rubber-like material, may be removed, nevertheless, it is firmly retained in place against accidental dislodgment, and if used as a seal ring 8, may be depended upon to maintain its place during assembly of adjacent sections of pipe. Certain advantages are gained when the seal ring 8 itself is cast in place and not removed. The seal ring is retained in a perfect circle by the casting flange and is held in a single plane by the shoulder or the casting flange and the band. Due to the inherently close tolerances and the perfect fit of the O-ring, not only in its own groove but also in its contact with the spigot end of the adjacent pipe, a dependable seal is obtained.

It will be further observed that assembly of either the collar-and-spigot or bell-and-spigot pipe is extremely simple, requiring no time consuming field operations.

It will be observed that the spigot end when inserted to its normal depth clears the shoulder formed at the side of the flange 6 or at the inner end of the bell by a slight distance. In practice, about thirty-second to sixteenth inch gap is provided. The distance between the shoulder and the seal ring 8 is several times the nominal clearance space. Thus, several sections of pipes may bottom against their respective shoulders before some other connection will be separated far enough to cause failure. The taper provided between the radially confronting surfaces of the spigot end, collar or bell is relatively slight and serves mainly to aid in guiding the parts into position, and the spigot bottoms before exerting wedge pressure against the collar or bell except as may be exerted through the yieldable sealing ring. Thus complete circumferential contact between the collar or bell and spigot cannot occur. This is important for the reason that unyielding wedging pressure could cause tensile failure of the bell or collar.

Clearance between the radially confronting surfaces of the spigot end and collar or bell may be approximately one thirty-second of an inch. This dimension, of course, varies with the diameter of the pipe. In any case, the clearance is so related to the projection of the seal ring radially inwardly from its socket that should the spigot be displaced laterally so that at one side its surface is in physical contact with the bell or collar, the diametrically opposite portion of the seal ring is still in sealing engagement with the spigot.

It will be observed that with the substantially "line" contact afforded by the seal ring that the spigot is capable of slight angular deflection so that long radius curves may be formed with standard pipe sections.

It should also be observed that because of the relatively small clearance between the bell or collar and spigot, the area of the O rings subjected to line pressure is maintained at a minimum so that the seal ring can readily withstand any pressure within the capacity of the concrete pipe itself.

While there have been described what are at present considered preferred embodiments of the present invention, it will be apparent to those skilled in the art that various modifications and changes may be made without departing from the essence of the invention, and it is intended to cover herein all such modifications and changes as come within the true scope and spirit of the appended claim.

I claim:

A method of casting a plurality of concrete pipe collars, characterized by: placing a series of casting rings, each having a radially directed central flange and axially directed lips, within a tubular casting shell; separating said casting rings by annular foraminous reinforcing units; rotating said casting shell; and introducing cementitious material therein, whereby said cementitious material is urged by centrifugal force radially outwardly between the confronting ends of said lips, through and around said reinforcing units, and crowded axially between said lips and said casting shell.

References Cited in the file of this patent

UNITED STATES PATENTS

| | | |
|---|---|---|
| 359,484 | Whitley | Mar. 15, 1887 |
| 1,117,856 | Kent | Nov. 17, 1914 |
| 1,582,586 | Dundas | Apr. 27, 1926 |
| 1,826,321 | Mitchell | Oct. 6, 1931 |
| 2,161,968 | Lyons | June 13, 1939 |
| 2,189,071 | Kopp | Feb. 6, 1940 |
| 2,216,896 | Trickey | Oct. 8, 1940 |
| 2,273,615 | Batie | Feb. 17, 1942 |
| 2,296,460 | McDonald | Sept. 22, 1942 |
| 2,301,760 | Sutton | Nov. 10, 1942 |
| 2,566,689 | Whiting | Sept. 4, 1951 |